Dec. 18, 1962 K. ZWICK 3,069,154
WORK LOCATING TABLE FOR MACHINE TOOLS
Filed March 30, 1959 2 Sheets-Sheet 1

INVENTOR
KURT ZWICK
BY Dicke, Craig & Freudenberg
ATTORNEYS

Dec. 18, 1962 K. ZWICK 3,069,154
WORK LOCATING TABLE FOR MACHINE TOOLS
Filed March 30, 1959 2 Sheets-Sheet 2
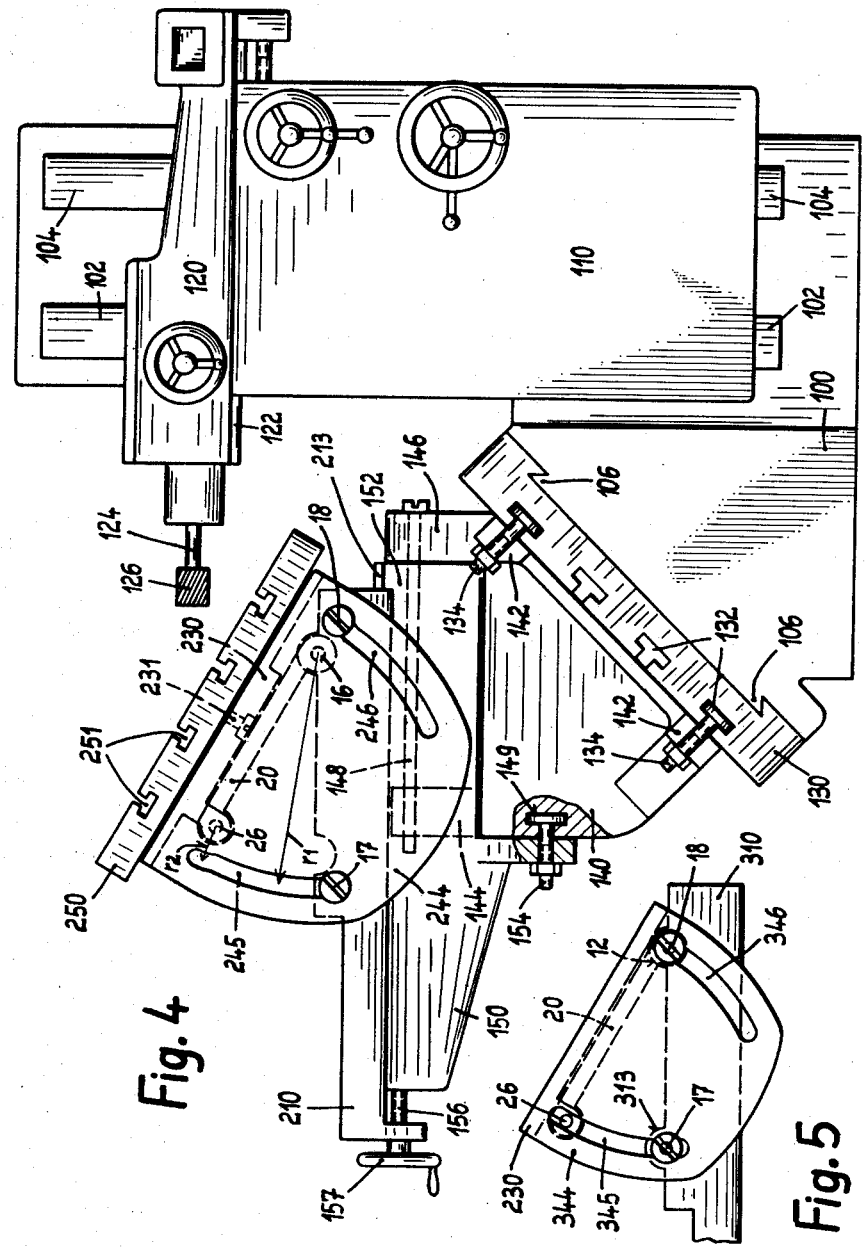
INVENTOR
KURT ZWICK
Dicke, Craig & Freudenberg
ATTORNEYS

United States Patent Office 3,069,154
Patented Dec. 18, 1962

3,069,154
WORK LOCATING TABLE FOR MACHINE TOOLS
Kurt Zwick, Munich, Germany, assignor to Hans Deckel, Munich, Germany, and Friedrich Wilhelm Deckel, Zug, Switzerland
Filed Mar. 30, 1959, Ser. No. 803,006
Claims priority, application Germany Apr. 16, 1958
4 Claims. (Cl. 269—73)

This invention relates to a table for holding and locating the work in a machine tool. The table contemplated by the invention is one comprising a swivelling work-locating plate mounted on a base.

In known devices of this kind the table is directly tiltably mounted on a cantilever base. This involves the disadvantage that the pivoted portion or the pivotal axis of the table, especially when the table may be set to considerable angularities in opposite pivotal directions from a position parallel to the base, is raised a considerable distance from its base and thus approaches undesirably close to the spindle. This involves a reduction in the working range of the machine for substantially all angular adjustments, the reduction being particularly great when the table is constructed with a single pivot to permit large adjustments, but is actually set at a small inclination to the base. The distance of the pivoted portion from the cantilever base also adversely affects the stability with which the plate is held. Despite the use of special supporting elements between the plate and the cantilever base the resultant lack of stability makes itself especially felt when precision work is to be performed.

It is an object of this invention to provide an improved work locating table of the aforementioned type providing greater stability for work that is supported thereby for pivotal adjustment.

Another object of this invention is to provide an improved work holding table of the above type providing greater angular displacement of the table without decreasing the work space between the table and a tool head.

Still another object of this invention is to provide an improved table as described above with a greater space between the table and a tool head while retaining maximum angular adjustment of the table.

A still further object of this invention is to provide an improved work tilting structure as an auxiliary piece of apparatus for detachable mounting on the work supporting base of a machine tool.

Another object of the invention is to provide a work supporting table that is pivotable about more than one axis and particularly such a work table the adjustment of which can be effected about only one axis at one time.

The table proposed by the present invention substantially avoids the described drawbacks. This result is achieved by the employment of an intermediate member for connecting the plate with the base, this intermediate member being provided with two parallel hinges of which one serves for tiltably mounting the intermediate member on the cantilever support whereas the other serves for mounting the work-locating plate on the intermediate member. Part of the total angular deflection range of the table is served by the tilting of the intermediate member about one of the hinges, whereas the remaining deflection is effected by tilting the plate about the other hinge. The angle of deflection about each hinge is therefore only about half that of the total deflection angle about the single hinge otherwise provided in a conventional form of construction. This reduction in the deflection angle about each of the hinges reduces over substantially the entire adjustment range the resultant distance of the outermost tilted end of the plate from the base and thereby improves precision besides increasing the working range of the machine.

The table pivotally connected to the intermediate member may be fixed in position relative the base by supporting members extending therebetween and fixed or clamped thereto in any suitable manner. These supporting members may take the form of separate supporting straps disposed adjacent the respective hinge axes at opposite ends of the intermediate member, or, they may each be constructed as a web member secured to one member, of the table and base members, and having arcuate slots for guiding the web member relative to fixed projections secured to the other of the table and base members. The arcuate slots may be so positioned relative each other as to prevent pivotal movement of the table about more than one hinge axis when making an adjustment. The projections which move in the arcuate slots may be coaxial with the hinge axis at opposite ends of the intermediate member in which case each of the slots is circular, or the projections may be spaced from these axes in which case each slot has curved portions of different radii.

The foregoing and other objects, features and advantages of the present invention will become more obvious from the following description when taken in connection with the accompanying drawings which show, for purposes of illustration only, several preferred embodiments of the present invention, and wherein:

FIGURE 4 is an alternative form of construction of the table and illustrates the manner of mounting the same in a machine tool with a sloping table slideway, and FIGURE 5 is yet another embodiment of the table and its support means.

Figure 1:
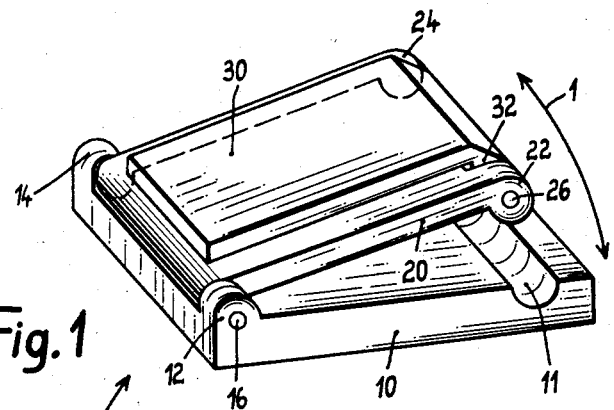
FIGURES 1 and 2 show the principal parts of the work table in simplified form and in perspective view, the work-carrying plate being in two different adjusted positions respectively.

The table is mounted on a generally flat base 10 which (FIGURES 1 and 2) is substantially plate-shaped. This base is formed with two semi-circular projections 12, 14 drilled parallel to the upper flat surface of the base, preferably in the plane thereof, for the reception of a transverse hinge pin 16. Fulcrumed on this hinge pin is an intermediate member 20 which is likewise substantially plate-shaped, the axis of pin 16 being coplanar with the lower surface of the member 20. At its end remote from hinge 16 the intermediate member is also formed with two projections 22, 24 similarly drilled for the reception of a second hinge pin 26, the axis of which is also substantially coplanar with the lower face of member 20. The work-locating plate 30 is fulcrumed on this latter hinge, an offset projecting portion 32 of the work-locating plate gripping hinge pin 26. In the position illustrated in FIGURE 1 the flat lower face of work-locating plate 30 rests bodily on upper face of the intermediate member 20 and both components together can be tilted about hinge 16, as indicated by arrow 1. In its lowest horizontal position the flat lower face of intermediate member 20 rests bodily on the base 10 which has a trough-shaped depression 11 for the reception therein of the projecting jointed parts of intermediate member 20 and work-locating plate 30.

The left end of the base 10 terminates adjacent the hinge axis 16 to avoid interference with the plate 30 when the latter is pivoted to a position approaching that perpendicular to the base 10. In the alternative, the left end of the plate 30 must be sufficiently short to prevent interference with pivotal movement thereof by engagement with the base 10. In like manner, the plate 30 may terminate adjacent the hinge axis 26 to permit it to be pivoted thereabout to a position perpendicular to base 10 without interference by the latter. The ends of the base and of the plate adjacent their respective hinge pins may be considered the hinged ends, and the opposite ends referred to as the free ends.

Figure 2:
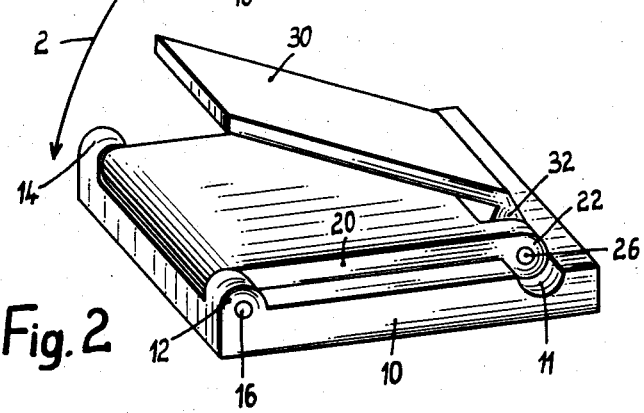

As illustrated in FIGURE 2 the work-locating table may also be tilted in relation to the intermediate member about hinge 26, as indicated by arrow 2. The two hinges 16 and 26 are parallel. The base 10 of the table is fitted with conventional clamping means, not shown in FIGURES 1 and 2, for affixing the same to the work table of a machine tool. The work-locating plate 30 serves for holding and locating the work which is thus adjustable with the plate by tilting the same about both hinges 16 and 26.

The upper surface of plate 30 may be constructed in any way well known manner for direct fitting or attachment of work thereto, or it may be provided with an auxiliary table secured thereto as described hereinafter in connection with FIGURE 4. Similarly, the base 10 may be constructed for attachment to any well known machine tool base or may be constructed as a part of the latter.

Figure 3:
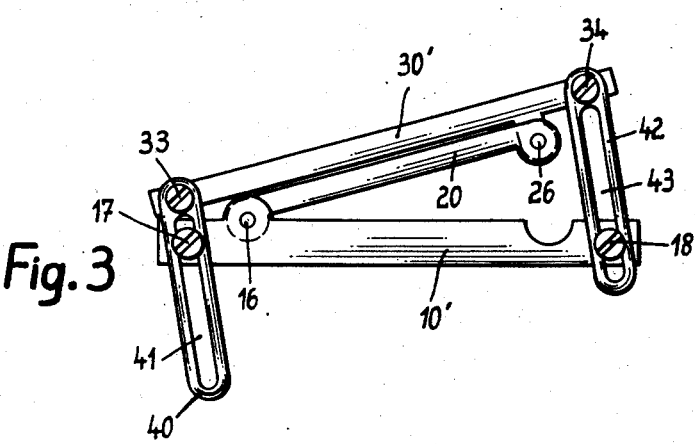
FIGURE 3 illustrates a table as shown in FIGURE 1, with special supporting elements.

To secure the work-locating plate in its deflected position in relation to the base strap members 40, 42 are affixed to the opposite sides of a locating plate 30' by screws 33, 34 as illustrated in FIGURE 3. These strap members have lengthwise slots, 41, 43 which engage clamping screws 17, 18 in the opposite sides of a base 10'.

The position of the work-locating plate shown in FIGURE 3 corresponds with that illustrated in FIGURE 1. If the screws 17, 18, and 33, 34 are loosened the locating plate 30' can be adjusted to any angular position, for instance to that shown in FIGURE 2. Although the adjustable table 30' of FIGURE 3 could be pivoted about both axes 16 and 26 while making one adjustment, it is preferred that the adjustment be made about only one axis to minimize the distance of the upper face from the base 10'.

One machine tool utilizing the present invention, as illustrated in FIGURE 4, has a pedestal 100 with vertical slideways 102, 104 in which gear casing 110 can be raised and lowered. The gear casing provides support for a headstock 120, which can be horizontally traversed in slideways 122, i.e., in FIGURE 4 from left to right or from right to left, and which mounts a spindle 124 which carries a tool 126. The machine pedestal further carries a table 130 which can be traversed horizontally in V-guides 106, i.e., in FIGURE 4 perpendicularly to the plane of the drawing, by any suitable known means.

The machine table 130 is provided with locating slots 132 for the reception of clamping screws 134 which engage lugs 142 in an intermediate slide 140 and pull the same on to the machine table 130. The intermediate slide has two projections 144, 146 with holes drilled therethrough for the reception of a shaft 148. This shaft 148 tiltably carries a bedplate 150 and passes through part 152 which is integral with bedplate 150. For securing the bedplate in any desired angular position on shaft 148 a locating screw 154 is provided thereon, the head of the screw engaging a semicircular slot in the bedplate. The centre of curvature of the slot lies in the centre axis of shaft 148 and the slot is in a plate normal to the axis and perpendicular to the plane of the paper in FIGURE 4.

The bedplate 150 carries in direct sliding engagement therewith a saddle or base 210 of the work-locating table. By means of a screw spindle 156 this saddle can be traversed horizontally in slideways 213, i.e., in FIGURE 4 to the right or to the left. For operating the screw spindle the latter is fitted with a handwheel 157. The embodiment of the work-locating table illustrated in FIGURE 4 likewise comprises an intermediate plate 20 which is hingeably attached to the saddle by means of a hinge pin 16. The intermediate plate in turn is provided with a hinge pin 26 for hingeably mounting a plate 230. However, unlike the forms of construction illustrated in FIGURES 1 to 3 this plate is not directly fitted for the reception of the work but carries a vertical pivot pin 231 upon which the work-locating table 250 is fulcrumed, the table 250 bearing slideably on plate 230. The work-locating table has clamping slots 251 for clamping the work thereto.

Unlike the form of construction illustrated in FIGURE 3 plate 230 is supported from saddle 210 not by strap members but by a sheet metal web member 244 affixed in any suitable manner to the plate and provided with arcuate slots 245, 246. These are engaged by clamping screws 17, 18 screwed into the saddle at points near to but spaced from the axis of pin 16 and the lowermost position of axis 26, respectively. Each slot comprises two arcuate sections of different curvature. Each of these slots has a minor portion of one curvature adjacent the respective hinge axis 26 or 16, respectively, and a major portion of greater radius of curvature. The centres of curvature of the arcs of slots 245 and 246 are on the one hand, in the centre axis of hinge pin 16 and, on the other hand, in the centre axis of hinge pin 26. The radii of curvature $r^1$ and $r^2$ of one slot are indicated in FIGURE 4. Instead of a single sheet metal web 244, one such web member may be provided on each side of the plate 230.

The configuration of the slots in the web member restricts the latter to pivotal movement about only one of the hinges axes at any one time.

The form of construction of the work-locating table shown in FIGURE 5 differs from that in FIGURE 4 by the arrangement of the clamping screws 17, 18 on the saddle or base 310 and the shape of the slots in the supporting web member 344. One clamping screw 18 is threaded into projection 12 coaxially with the hinge pin 16. The other clamping screw 17 is screwed into a projection 313 in saddle 310 in such manner as to be coaxial with the hinge pin 26 when this is in its lowest position, i.e., when the intermediate plate, as shown in FIGURE 2, lies flat on the saddle. The sheet metal web 344 secured to plate 230 has arcuate slots 345, 346 so arranged that the centres of curvature coincide with the centres of the hinge pins 16 and 26 respectively. Unlike the form of construction according to FIGURE 4 only one centre of curvature is associated with each slot. As in the illustration in FIGURE 4, the slots 345 and 346 also restrict the table 230 to pivotal movement about only one of the hinge axes at any one time.

The illustrated work-locating table of each illustrated embodiment is manipulated in such a way, as seen in FIGURES 1 and 2, that the table or plate remains flat on the intermediate plate 20 whilst being deflected within the region indicated in FIGURE 1 by arrow 1, so that in this angular region these two parts are deflected together. When deflecting the table within the region indicated in FIGURE 2 by arrow 2 the intermediate plate 20 remains flat on the base or saddle 10 or 210 and the table is tilted about pin 26. To secure the table in the desired angular position in relation to the base or saddle the screws 17 and 18 are tightened, causing the strap members 40, 42 or the web members 244, 344 to be clamped against the base or saddle 10 or 210 or 310 and the table to be locked in position in relation to the saddle.

It will be readily understood that the invention is not limited in scope to the illustrative embodiments that have been described. The basic idea which underlies the invention may also be embodied by employing alternative structural means, for instance by constructing the intermediate member of two parts in the form of lateral strap members, for example, by using only the side portions of the plate 20 extending between the respective axes 16 and 26 or by modifying the clamping plate of the machine table itself in such a way that it can be hingeably deflected in the manner herein described.

While the invention has been described in detail with respect to certain now preferred examples and embodiments of the invention, it will be understood by those skilled in the art after understanding the invention that various changes and modifications may be made without departing from the spirit and scope of the invention and it is intended therefore, to cover all such changes and modifications in the appended claims.

What is claimed is:

1. A work locating table for a machine tool comprising a clamping plate and a base, said clamping plate having hinge means adjacent one end thereof and a free end at the opposite end thereof, said base having hinge means spaced in a horizontal plane from the hinge means of said clamping plate, the respective hinge means being positioned essentially at opposite ends of an intermediate plate which is provided with two spaced parallel pivot axes of which one serves for tilting both the intermediate plate and clamping plate as a unit in relation to the base and the other for the angular adjustment of the clamping plate in relation to both the intermediate plate and the base, clamping screws provided on the base, said table being adjustable to a collapsed position in which the free end of the clamping plate is adjacent the hinge means of the intermediate plate and the hinge means of the clamping plate is supported upon the base, at least one supporting means interconnecting directly said clamping plate and said base and including a web plate affixed to the clamping plate perpendicularly to the pivot axes and provided with two arcuate slots for engagement with the clamping screws provided on the base.

2. A work locating table for a machine tool adapted to be mounted on a bedplate of a machine tool comprising a clamping plate and a base, said base being constructed as a saddle for sliding movement on the bedplate, said clamping plate having hinge means adjacent one end thereof and a free end at the opposite end thereof, said base having hinge means spaced in a horizontal plane from the hinge means of said clamping plate, the respective hinge means being positioned at essentially opposite ends of an intermediate plate which is provided with two spaced parallel pivot axes of which one serves for tilting both the intermediate plate and the clamping plate as a unit in relation to the base and the other for the angular adjustment of the clamping plate in relation to both the intermediate plate and the base, clamping screws provided on the base, said table being adjustable to a collapsed position in which the free end of the clamping plate is adjacent the hinge means of the intermediate plate and the hinge means of the clamping plate is supported upon the base, at least one supporting means interconnecting directly said clamping plate and said base and including a web plate affixed to the clamping plate perpendicularly to the pivot axes and provided with two arcuate slots for engagement with the clamping screws provided on the base.

3. A work locating table for a machine tool comprising a clamping plate and a base, said clamping plate having hinge means adjacent one end thereof and a free end at the opposite end thereof, said base having hinge means spaced in a horizontal plane from the hinge means of said clamping plate, the respective hinge means being positioned essentially at opposite ends of an intermediate plate which is provided with two spaced parallel pivot axes of which one serves for tilting both the intermediate plate and the clamping plate as a unit in relation to the base and the other for the angular adjustment of the clamping plate in relation to both the intermediate plate and the base, clamping screws provided on the base, said table being adjustable to a collapsed position in which the free end of the clamping plate is adjacent the hinge means of the intermediate plate and the hinge means of the clamping plate is supported upon the base, at least one supporting means interconnecting directly said clamping plate and said base and including a web plate affixed to the clamping plate perpendicularly to the pivot axes and provided with two arcuate slots for engagement with the clamping screws provided on the base, each of the slots consisting of two adjoining arcuate sections of different radii of curvature, the centres of curvature of each section being located in the two pivot axes.

4. A work locating table for a machine tool comprising a clamping plate and a base, each of these two members having a free end and a hinged end, at least one intermediate plate member which is provided with at least two spaced hinge means positioned essentially at opposite ends thereof, said hinge means having respective parallel pivot axes of which one serves for the angular adjustment of the intermediate plate member in relation to the base and the other for the angular adjustment of the clamping plate in relation to the intermediate plate member, a plurality of essentially vertically disposed essentially parallel support members each having its ends interconnecting said clamping plate and said base for mounting the clamping plate in adjusted position relative to said base, said table being adjustable to a collapsed position in which the free end of the clamping plate is adjacent the hinged end of the base and being adjustable to at least two other positions in one of which the hinged end of said plate is pivoted away from said base.

References Cited in the file of this patent

UNITED STATES PATENTS

| | | |
|---|---|---|
| 1,466,746 | Ohlen | Sept. 4, 1923 |
| 1,875,910 | Zimmermann | Sept. 6, 1932 |
| 1,932,546 | Graves | Oct. 31, 1933 |
| 2,351,773 | Lovenston | June 30, 1944 |
| 2,353,891 | Gruntorad | July 18, 1944 |
| 2,543,352 | Brown | Feb. 27, 1951 |
| 2,816,489 | Robbins | Dec. 17, 1957 |

FOREIGN PATENTS

| | | |
|---|---|---|
| 818,162 | Germany | Oct. 22, 1951 |
| 770,697 | Great Britain | Mar. 20, 1957 |
| 1,147,197 | France | Nov. 20, 1957 |